United States Patent [19]

Buss et al.

[11] 4,238,372

[45] Dec. 9, 1980

[54] CATALYTIC REFORMING CATALYST

[75] Inventors: Waldeen C. Buss, Richmond; Harris E. Kluksdahl, San Rafael, both of Calif.

[73] Assignee: Chevron Research Company, San Francisco, Calif.

[21] Appl. No.: 36,207

[22] Filed: May 4, 1979

Related U.S. Application Data

[63] Continuation-in-part of Ser. No. 583,236, Jun. 2, 1975, abandoned, which is a continuation-in-part of Ser. No. 355,606, Apr. 30, 1973, abandoned, which is a continuation-in-part of Ser. No. 301,696, Oct. 27, 1972, Pat. No. 3,852,190.

[51] Int. Cl.$^3$ .................. B01J 23/62; B01J 23/08; C10G 35/06
[52] U.S. Cl. ..................... 252/466 PT; 252/463; 208/138; 208/139
[58] Field of Search .................. 252/466 PT, 463

[56] References Cited

U.S. PATENT DOCUMENTS 3,846,343  11/1974  Erickson et al. .............. 252/466 PT

*Primary Examiner*—Delbert E. Gantz
*Assistant Examiner*—William G. Wright
*Attorney, Agent, or Firm*—D. A. Newell; R. H. Davies; W. D. Reese

[57] ABSTRACT

An improved catalyst, having a reduced fouling rate when used in a catalytic reforming process, said catalyst comprising platinum disposed on an alumina support wherein the alumina support is obtained by removing water from aluminum hydroxide produced as a by-product from a Ziegler higher alcohol synthesis reaction, and wherein the alumina is calcined at a temperature of 1100°–1400° F. so as to have a surface area of 165 to 215 square meters per gram.

3 Claims, No Drawings

CATALYTIC REFORMING CATALYST

CROSS-REFERENCE TO RELATED APPLICATIONS

This application is a continuation-in-part of our application Ser. No. 583,236, filed June 2, 1975, now abandoned, which is a continuation-in-part of our application Ser. No. 355,606, filed Apr. 30, 1973, now abandoned, which in turn is a continuation-in-part of our application Ser. No. 301,696, filed Oct. 27, 1972, now U.S. Pat. No. 3,852,190.

BACKGROUND OF THE INVENTION

The present invention relates to reforming catalysts comprising platinum on alumina, and preferably also comprising rhenium.

It is well known in the catalytic reforming of petroleum hydrocarbons in the presence of hydrogen, which reforming is frequently called hydroforming, that complex chemical reactions occur. Thus, when petroleum hydrocarbon fractions such as those boiling in the gasoline range, particularly between about pentane and 450° F., are mixed with hydrogen and passed over a platinized alumina catalyst at a temperature of about 600°–1100° F. and pressure of about 25–500 psi, i.e., at reforming conditions, their fuel value in an internal combustion engine is materially improved. This is due to a number of reactions which take place simultaneously, including an isomerization reaction, dehydrocyclization and aromatization reactions and also a hydrocracking reaction.

Platinum-alumina reforming catalysts are often made by impregnating alumina with a platinum compound. For example, U.S. Pat. No. 3,617,519 discloses the preparation of a platinum-rhenium-alumina reforming catalyst wherein the platinum is impregnated into an alumina support by commingling the alumina support with an aqueous solution of chloroplatinic acid. Following the platinum impregnation, the impregnated carrier is typically dried and subjected to a conventional high temperature calcination or oxidation treatment.

U.S. Pat. No. 3,617,519 discloses that in most cases it is advantageous to adjust the concentration of the halogen component in the platinum-rhenium-alumina catalyst during the calcination step by injecting, into the air stream used therein, an aqueous solution of a suitable halogen-containing compound. U.S. Pat. No. 3,617,519 discloses that the halogen component can be added to the catalyst in various ways including adding the halogen during the impregnation through the utilization of a mixture of chloroplatinic acid and hydrogen chloride.

Typical calcination temperatures used in the preparation of the alumina support for reforming catalysts cover a wide range from about 800° to 1300° F., and frequently are 1100° F. or lower.

SUMMARY OF THE INVENTION

According to the present invention, a catalyst is provided for use in reforming a naphtha feedstock, said catalyst comprising platinum disposed on an alumina support wherein the alumina support is obtained by removing water from aluminum hydroxide produced as a by-product from a Ziegler higher alcohol synthesis reaction, and wherein the alumina is calcined so as to have a surface area of 165 to 225 square meters per gram. The calcination may be accomplished at 1100° to 1400° F.

Halogen compounds which can be included in the catalyst include fluorine, chlorine, bromine and iodine. Fluorine and chlorine are preferred and chlorine is especially preferred.

It is preferred to calcine the catalyst so as to adjust the surface area to between 165 and 225 $m^2$/gm. Adjustment of the surface area is achieved by the calcination temperature, calcination time and calcination atmosphere. The factors which favor reduction of surface area include higher calcination temperatures, longer calcination time and the use of a moist calcination atmosphere as opposed to a dry calcination atmosphere. In preparing the catalyst of the present invention, it is particularly preferred to calcine the alumina support so that it has a surface area between 165 to 225 $m^2$/gm and more preferably from 165 to 215 $m^2$/gm.

The catalyst composition of the present invention comprises platinum on alumina, preferably 0.01 to 5.0 weight percent platinum on the alumina support. Preferably the catalyst also contains rhenium; preferred amounts of rhenium are 0.01 to 5.0 weight percent, based on the finished catalyst.

In preparing the catalyst of the present invention, the alumina support may be impregnated with a platinum compound in the presence of a halide, preferably chloride. Various platinum compounds can be used, such as chloroplatinic acid, ammonium chloroplatinate, and tetramine platinous nitrate. Preferably, an anionic form of platinum compound is used as opposed to a cationic form of platinum. Chloroplatinic acid is an anionic form, and tetramine platinum is a cationic form. Chloroplatinic acid and hydrochloric acid are especially preferred as the platinum source and the free halide source. Preferably, sufficient halide is used so that the catalyst preparation contains more than 1.2 weight percent free halide. This weight percent halide is based on dried catalyst, that is, impregnated catalyst which has been dried at a temperature of 200° F. for one hour or equivalent drying. Desirably sufficient halide is used in the platinum impregnation step to achieve between 1.4 and 4 weight percent free halide in the catalyst preparation; particularly preferred free halide levels are about 1.4 to 2.5 weight percent.

The term "free" halide is used herein to mean that halide which is not accountable simply based on the combined halide in the platinum-impregnating compound. The formula for chloroplatinic acid is $H_2PtCl_6$, and taking into account the atomic weight of Pt and of Cl, there is about one part by weight of Pt per one part by weight Cl in $H_2PtCl_6$. Thus, when making a catalyst containing 0.3 weight percent platinum, using chloroplatinic acid as the source of platinum, 0.3 weight percent chloride is accountable based on the source of platinum. Therefore, if the dried catalyst contains 1.2 weight percent free chloride, it would contain 1.5 weight percent total chloride.

Preferably, the platinum content of the calcined catalyst is at least 0.2 weight percent platinum, more preferably 0.3 weight percent or more. Usually the total platinum content is less than about 5.0 weight percent.

The halide is usually reduced to below 1.1 weight percent halide, calculated on a free halide basis, to obtain the finished or calcined catalyst. The halide reduction can be by high-temperature treatment, for example 500° to 1200° F., preferably 600° to 1000° F. Preferably the high-temperature treatment is in the presence of air.

Also, a steam/air mixture can be used. Preferably the calcination of the platinum containing catalyst preparation is carried out to reduce the halide by at least 0.1 weight percent, much more preferably by at least 0.25 weight percent.

The alumina support component of the catalyst of the present invention is alumina obtained by removing water from aluminum hydroxide produced as a by-product from a Ziegler higher alcohol synthesis reaction. Ziegler alcohol synthesis reactions are described, for example, in Karl Ziegler's U.S. Pat. No. 2,892,858. The general method of synthesis can be indicated as follows:

The first step is the preparation of triethylaluminum from aluminum, hydrogen, and ethylene. This is carried out in two stages with recycle of two-thirds of the product, triethylaluminum.

in the polymerization step ethylene is added.

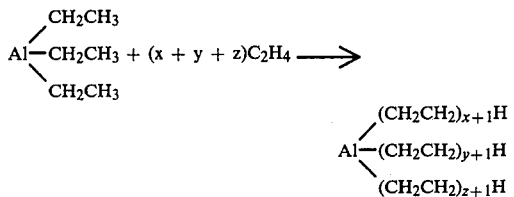

The oxidation step converts this product to an aluminum alkoxide.

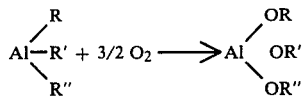

The alcohols are then formed by a hydrolysis step.

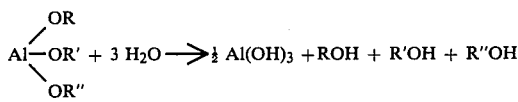

As pointed out in Example 1 of U.S. Pat. No. 2,892,858, alumina of high purity can be obtained by the removal of water from the aluminum hydroxide paste which is obtained from the hydrolysis step.

Our application Ser. No. 301,696, now U.S. Pat. No. 3,852,190, is directed to a reforming process using a catalyst comprising alumina obtained from a Ziegler higher alcohol synthesis reaction.

EXAMPLE I

Two series of catalysts according to the present invention, Catalyst Series A and Catalyst Series B, were prepared using Ziegler by-product alumina which had been extruded and dried at about 500° F. Portions of this alumina were calcined separately for 2 hours in dry air, at various temperatures within the ranges disclosed herein, prior to impregnation of the alumina.

The A series was prepared by a single impregnation of chloroplatinic acid, perrhenic acid, and hydrochloric acid using amounts calculated to give 0.30 percent platinum, 0.30 percent rhenium, and 1.7 percent total chloride. The final catalysts were dried overnight at 300° F., then calcined in wet air at 950° F. for 2.0 to 5.6 hours. The wet air flow direction was reversed part way through the wet calcining to provide a more uniform chloride distribution in the catalyst bed. The mole fraction of $H_2O$ in the wet air was about 0.03.

The B series was prepared by a single impregnation of chloroplatinic acid, perrhenic acid and hydrochloric acid using amounts calculated to give 0.30 percent platinum, 0.30 percent rhenium, and 1.2 percent total chloride. The final catalysts were dried overnight at 300° F., then calcined in dry air at 950° F. for 2 hours.

The 1.2 weight percent chloride level of the B series of catalysts is close to the typical chloride level of a reforming catalyst, as usually it is desired to obtain a finished reforming catalyst having about 1 weight percent chloride and some small amount of chloride may be lost in final calcination of the platinum-impregnated alumina as, for example a loss of about 0.1 to 0.2 weight percent chloride.

The finished catalysts for both the A and B series contained about 0.3 weight perecent platinum. The catalysts were prepared using chloroplatinic acid; thus 0.3 weight percent chloride is subtracted from the total chloride values to calculate the amount of free chloride. Then the series A preparations had about 1.4 weight percent free chloride and series B about 0.9 weight percent free chloride.

Catalytic reforming operations were conducted using the finished A series catalysts and the finished B series catalysts.

The test conditions used to test the A series and B series catalyst included:

| Feed: | Heavy naphtha |
|---|---|
| Product octane: | 102 F-1 clear |
| Temperature: | Programmed to hold constant product octane |
| Pressure | 80 psig |
| H$_2$ to naphtha ratio: | 3.8 moles H$_2$ to 1 mole hydrocarbon |
| LHSV: | 3.0 |
| Run length: | 15 to 24 hours |

The fouling rate for the catalysts was found to be lowest when the alumina support was calcined in the range of 1000° to 1500° F., and within this range was lower as the calcination range was narrowed to 1100° to 1400° F. The optimum low fouling range was related to the preferred calcination range of about 1100° to 1350° F., particularly 1100° to 1300° F., shown on the graph in U.S. Ser. No. 355,606.

EXAMPLE II

As shown in Table I (Part A), catalysts prepared according to this invention (and impregnated with platinum, rhenium and chloride in the same manner as discussed below) had a substantially lower fouling rate than (a) catalysts prepared from the same by-product alumina which has been calcined at higher or lower temperatures, which are shown in Part B of Table I, and (b) catalysts prepared using conventional precipitated alumina bases made from aluminum chloride, which are shown in Part C of the Table.

Catalysts on alumina supports were prepared using alumina formed by a conventional precipitation method by dissolving AlCl$_3$.6H$_2$O in water and adding NH$_4$OH solution slowly with stirring until the pH reached 9.25, heating this mixture with stirring to 150° F., and holding the mixture at 150° F. for two hours, at which time the pH was 8.6. The mixture was then cooled, filtered, dried overnight at 130° F. and extruded. The extruded material was washed five times with ammonium acetate solution at 125° F. and dried overnight at 250° F. The conventional precipitated alumina was then calcined as shown in Part C of the first column of Table I and after calcination, the alumina was impregnated with a mixed solution of $H_2PtCl_6$, $HReO_4$ and HCl to give a catalyst with a composition of 0.3 wt. % Pt, 0.3 wt. % Re and 1.7 wt % Cl, after pore fill impregnation and drying at 300° F. The catalysts were then calcined in wet air to lower the chloride level to about 1 wt. %, and as shown in Part C of the Table, these precipitated alumina catalysts had significantly higher fouling rates than catalysts prepared according to the present invention.

The results of these tests show that catalysts prepared according to the subject invention, using a by-product alumina from a Ziegler higher alcohol synthesis, which have been calcined in a narrow temperature range, have physical characteristics which are significantly and surprisingly different from the characteristics of catalysts prepared from precipitated alumina, evidenced by the fact that the presently-claimed catalysts are outstanding reforming catalysts. A significant part of the superior performance of these catalysts is believed to be attributable to the relatively narrow temperature range in which the alumina is calcined.

TABLE I

| Calcinated Alumina (In Flowing Dry Air For Two Hours at Temperature Specified) | | All Catalysts Impregnated with 0.3 Wt. % Pt, 0.3 Wt. % Re, 1.7 Wt. % Cl Prior to Wet Calcining in Air to Reduce Cl to about 1 Wt. % | | |
|---|---|---|---|---|
| Cal. Temp. °F. | Surface[1] Area $M^2$/g. | % Cl. Wet Cal. | To, Initial Temp. In Reforming Test | F.R. |
| PART A - INVENTION CATALYST BASE | | | | |
| 1150 | 212 | | | |
| 1250 | 199 | 1.00 | 930 | 2.3 |
| 1350 | 184 | | | |
| PART B - HIGH AND LOW TEMP. CALCINATION | | | | |
| 950 | 229 | 1.20 | 930 | 3.2 |
| 1600 | 160 | .83[2] | 947 | 3.7 |
| PART C - PRECIPITATED ALUMINA BASE | | | | |
| 1100 | 332 | 1.37 | 918 | 5.4 |
| 1250 | 281 | 1.31 | 912 | 4.6 |
| 1400 | 252 | 1.15 | 919 | 4.0 |
| 1550 | 234 | 1.11 | 919 | 4.0 |

[1]Average of 2 Measurements.
[2]Given 2nd Wet Calcine With Added Cl to Try to Raise Cl level from 0.72 Wt. %, Reached 0.83 Wt. %.

EXAMPLE III

This example shows that catalysts prepared by the presently claimed process in which the alumina is calcined prior to metals impregnation is superior to catalysts prepared by calcining alumina after metals impregnation.

Catalysts were prepared according to the present invention by mulling with $HNO_3$ an alumina obtained by removing water from aluminum hydroxide produced as a by-product from a Ziegler higher alcohol synthesis reaction, extruding the alumina, and calcining portions of the extrudate at the temperaturees shown in Part A of Table II. Each of the portions was co-impregnated with platinum, rhenium and chloride sufficient to provide 0.3 wt. % platinum, 0.3 wt. % rhenium and about 0.6 wt. % chloride, and finally the resulting composites were calcined at 700° F.

Comparison catalysts were prepared as outlined in U.S. Pat. No. 2,838,375 by mulling with an aqueous solution of chloroplatinic acid, perrhenic acid and hydrochloric acid the alumina obtained by removing water from aluminum hydroxide produced as a by-product from a Ziegler higher alcohol synthesis reaction to provide, after extrusion and drying, and extrudate having 0.3 wt. % platinum, 0.3 wt. % rhenium and about 0.6 wt. % chloride, extruding and drying. Portions of the extrudate were calcined at the temperatures shown in Part B of Table II.

Naphtha reforming tests were performed using each of the catalysts prepared by calcining prior to metals impregnation and each of the catalysts prepared by calcining after metals impregnation at reforming conditions chosen to accelerate catalyst fouling, including 160 psig pressure, 4.0 LHSV, 4.0 hydrogen/hydrocarbon mole ratio, with the operating temperature adjusted to maintain a product having a constant octane number of 99 RON (clear). The Fouling Rates shown in Table II are the rates of increase in temperature necessary to maintain the constant product octane number for each catalyst. The Fouling Rates numbers are an accurate indication of the relative stability of each of the catalysts and, accordingly, the desirability of each of the catalysts for use in naphtha reforming.

TABLE II

| Calcination Temperatures (°F.) | Fouling Rates |
|---|---|
| PART A | |
| 1100 | 1.6 |
| 1200 | 1.2 |
| 1400 | 1.2, 1.3 |
| 1600 | 1.6 |
| PART B | |
| 700 | 3.0 |
| 900 | 1.4 |
| 950 | 1.8 |
| 1100 | 2.3 |

The catalysts shown in Part A of Table II, calcined prior to metals impregnation, have different properties from the catalysts shown in Part B of Table II—catalysts shown in Part A are superior reforming catalysts as demonstrated by comparison of their fouling rates with those of the catalysts shown in Part B. The data show that the optimum calcination temperature for the catalysts in Part A is between 1100° F. and 1600° F. and the optimum calcination temperature for the catalysts in Part B is between 700° F. and 1100° F. The data in Table II demonstrate that calcination after metals impregnation, as described in U.S. Pat. No. 2,838,375, is not equivalent to calcination prior to metals removal, as specified for the catalyst in the present application.

EXAMPLE IV

This example demonstrates that catalysts prepared by the presently claimed process using an alumina formed as a by-product from a Ziegler higher alcohol synthesis reaction is superior than catalysts using an alumina prepared by a conventional precipitation method.

In accordance with the presently claimed invention a dried extrudate formed from an alumina obtained by removing water from aluminum hydroxide produced as a by-product from a Ziegler higher alcohol synthesis reaction was obtained. Portions of the extrudate were calcined at the temperatures shown in Part A of Table III, and each portion was impregnated by the pore fill method with an aqueous solution of chloroplatinic acid, perrhenic acid and hydrochloric acid sufficient to provide dried compositions containing 0.3 wt. % platinum, 0.3 wt. % rhenium and 1.7 wt. % chloride. Each portion was dried at 300° F., and calcined at 950° F. in wet air until the catalysts each contained 0.3 wt. % platinum, 0.3 wt. % rhenium and about 1.0 wt. % chloride.

Further catalysts were prepared in exactly the same manner described in the above paragraph except that portions of the extrudate were calcined at the temperatures shown in Part B of Table III.

Comparison catalysts were prepared using an alumina base made by the conventional precipitation method. $AlCl_3 \cdot 6H_2O$ was dissolved in water and $NH_4OH$ solution was added slowly with stirring until the pH reached 9.25. The resulting mixture was held at 150° F. for two hours, the pH then being 8.6, and the mixture was then cooled, filtered, dried overnight at 130° F., extruded and washed with ammonium acetate solution at 125° F. and dried at 250° F. Portions of the resulting extrudate were calcined at the temperatures shown in Part C of Table III, their surface areas were measured and found to be as shown in Part C. Each portion was then impregnated by the pore fill method with an aqueous solution of chloroplatinic acid, perrhenic acid and hydrochloric acid sufficient to provide a dried composition containing 0.3 wt. % platinum, 0.3 wt. % rhenium and 1.7 wt. % chloride. The impregnated portions were dried at 300° F. and calcined at 950° F. in wet air until the catalysts each contained 0.3 wt. % platunum, 0.3 wt. % rhenium and about 1.0 wt. % chloride.

Each of the catalysts was identically individually tested for reforming a substantially sulfur- and nitrogen-free naphtha having a boiling range of 150°-430° F. and including 23.4 wt. % aromatics, 36.5 wt. % paraffins, and 40.1 wt. % naphthenes. The reforming operating conditions were chosen to accelerate catalyst fouling and included 80 psig pressure, 3.0 LHSV and 3.8 hydrogen/hydrocarbon mole ratio, with the operating temperature being adjusted to maintain a constant product octane number of 102 RON (clear). The Fouling Rates shown in Table III are the rates of increase in temperature necessary to maintain the constant product octane number for each catalyst, and they are an accurate indication of the relative stability of each of the catalysts and, accordingly, the desirability of each of the catalysts for use in naphtha reforming.

TABLE III

| Cal. Temp. °F. | Surface Area $M^2$/g. | Initial Temp. In Reforming Test | Fouling Rates |
|---|---|---|---|
| PART A | | | |
| 1150 | 212 | | |
| 1250 | 199 | 930 | 2.3 |
| 1350 | 184 | | |
| PART B | | | |
| 950 | 229 | 930 | 3.2 |
| 1050 | 221 | 930 | 2.8 |
| 1450 | 186 | 935 | 2.8 |
| 1600 | 160 | 947 | 3.7 |
| PART C - PRECIPITATED ALUMINA BASE | | | |
| 1100 | 332 | 918 | 5.4 |

TABLE III-continued

| Cal. Temp. °F. | Surface Area $M^2$/g. | Initial Temp. In Reforming Test | Fouling Rates |
|---|---|---|---|
| 1250 | 281 | 912 | 4.6 |
| 1400 | 252 | 919 | 4.0 |
| 1550 | 234 | 919 | 4.0 |

The results of these tests, as shown in Table III demonstrate that catalysts made according to the invention, as shown in Part A, possess unexpectedly different physical or chemical properties from catalysts calcined in a different temperature range (Part B) and from catalysts prepared in exactly the same manner from precipitated alumina (Part C), and demonstrate that the catalysts of Part A are surprisingly superior reforming catalysts; and that the catalysts of Part A are superior reforming catalysts even though the catalysts of Part C were prepared with the same platinum, rhenium and chloride contents.

EXAMPLE V

This example provides a side-by-side comparison of the catalyst of the present invention with a prior art catalyst made with a precipitated alumina base possessing similar surface area values.

A commercially available catalyst having a surface area of 202 $m^2$/g, employing a precipitated aluminum base, and containing 0.3 weight percent platinum, 0.3 weight percent rhenium and adjusted to about 1.0 weight percent chlorine, was tested for reforming at subtantially the conditions described in Example IV to obtain the Fouling Rate and Initial Reforming Temperature data shown in Table IV. These data are compared with data on the catalyst of the present invention taken from Table III.

TABLE IV

| Catalyst Base Source | Surface Area $M^2$/g | Initial Ref. Temp., °F. | Fouling Rate, °F./hr |
|---|---|---|---|
| Present Invention Table II, Part A | 199 | 930 | 2.3 |
| Ppt. Alumina Base Am. Cyanamid | 202 | 928 | 3.8 |

The results of these tests as shown in Table IV demonstrate that the use of "by-product" alumina required in the presently claimed catalyst results in a significantly lower fouling rate compared with a commercial catalyst prepared with a precipitated alumina base. This lower fouling rate demonstrated by the presently claimed catalyst shows that prior art catalysts prepared from a precipitated alumina base having a comparable surface area value do not possess the characteristics of the presently claimed catalyst.

What is claimed is:

1. A catalyst composition comprising 0.01 to 5 weight percent platinum and 0.01 to 5 weight percent rhenium disposed on an alumina support wherein the alumina is obtained by removing water from aluminum hydroxide produced as a by-product from a Ziegler higher alcohol synthesis reaction and wherein the alumina is calcined at a temperature of 1100°-1400° F. so as to have a surface area of 165-225 square meters per gram.

2. A catalyst in accordance with claim 1 wherein the alumina is calcined at 1100° to 1350° F.

3. A catalyst in accordance with claim 1 wherein the alumina is calcined at 1100° to 1300° F.

* * * * *